Patented Apr. 20, 1948

2,440,093

UNITED STATES PATENT OFFICE 2,440,093

TERPENE DERIVATIVES AND METHOD OF PRODUCING THE SAME

William O. Israel, Lakewood, Ohio, assignor to Industrial Rayon Corporation, Cleveland, Ohio, a corporation of Delaware No Drawing. Application July 12, 1943, Serial No. 494,394

9 Claims. (Cl. 260—611)

This invention relates to new terpene derivatives and it provides new compounds formed by the reaction of alkylene oxides with unsaturated or hydroxy terpenes.

The new compounds of the invention have valuable properties as dispersing, wetting and cleansing agents. Certain of the compounds have been found to be particularly advantageous as dispersing agents in the production of delustered viscose rayon and their use for this purpose is described and claimed in my copending application Serial No. 494,395.

In accordance with this invention, the new terpene derivatives are prepared by reacting at least three moles of an alkylene oxide with an unsaturated or hydroxy terpene, or a mixture of such terpenes, the reaction being advantageously carried out at an elevated temperature and in the presence of an alkaline catalyst. In general, operating temperatures within the range of about 100° C. to about 250° C. may be employed with advantage, although temperatures within the range of about 120° C. to about 150° C. are somewhat more advantageous.

The catalyst is advantageously an alkaline catalyst such as, for example, sodium hydroxide. The amount of catalyst used may vary, but, in general, proportions of catalyst ranging from .5% to 1% based on the weight of the terpene may be employed with advantage. Other alkali or alkaline earth metal catalysts may be used in place of sodium hydroxide. Such catalysts may include potassium hydroxide, sodium carbonate, or sodium alcoholates, such as sodium methylate.

The reaction is advantageously conducted by introducing a mixture of the terpene and the alkaline catalyst into a pressure-resistant reaction vessel, such as an autoclave, which is equipped with suitable agitating and heating means. The contents of the autoclave are then heated to a temperature of about 125 to about 150° C. with agitation, and a suitable amount of an alkylene oxide, such as ethylene or propylene oxide, is gradually introduced into the autoclave, preferably through a suitable meter. The rate of addition of the alkylene oxide to the terpene depends upon the efficiency of the means provided for dissipating the heat of the reaction. In general, operating temperatures within the range of about 100° C. to about 250° C. are satisfactory. The pressures attained in the autoclave during the reaction will depend upon the rate at which the alkylene oxide is introduced into the terpene and will vary from slightly above atmospheric to about 500 pounds per square inch, preferably, however, the pressure in the autoclave should not exceed about 50 to 100 pounds per square inch, as these pressures permit a ready control of temperatures and rate of reaction.

The duration of the reaction in the autoclave will depend upon the nature of the final product desired, the quantities of materials reacted, and upon the efficiency of the means provided for controlling the temperature in the autoclave during the reaction. For example, if it is desired to produce a final product in which 28 moles of ethylene oxide are reacted with 1 mole of a terpene, other things being equal, a longer length of time would be required than would be necessary for the production of a final product in which 4 moles of ethylene oxide are reacted with 1 mole of a terpene.

Upon completion of the reaction, or prior thereto, as indicated by a drop to substantially atmospheric pressure, and by a rapid decrease in temperature, the introduction of the alkylene oxide into the terpene in the autoclave is terminated and the autoclave is permitted to cool, e. g., to a temperature of approximately 90° C., and the contents of the autoclave are then discharged into a suitable receptacle and permitted to cool to room temperature. As thus prepared, the final product may be used for any of the purposes stated above.

For the reaction with alkylene oxide, according to the present invention, unsaturated terpenes or their isomeric terpene forms may be employed in either their pure form or in mixtures. Examples of such terpenes are pinene, camphene, bornylene, sabinene, thujene, fenchene, pinolene, dacrydene, limonene, or the racemic form dipentene, terpinolene, terpinene, phellandrene, sylvestrene, origanene, crithmene, moslene, and pseudolimonene.

Typical of the hydroxy terpenes which may be employed either alone or in admixture in accordance with this invention are such monohydric terpenes as terpineol, terpinenol and piperitol isomers and dihydric terpenes such as the various terpins, e. g., 1.8 terpin. The hydroxy terpenes may also include hydroxy alkylene ether derivatives of terpenes such as, for example, the hydroxy methylene, ethylene propylene or polyalkylene ether derivatives of the terpenes including such compounds as terpenyl ethylene glycol.

Among the mixtures of unsaturated terpenes or mixtures of such terpenes with hydroxy terpenes, which may be employed with advantage in practicing the invention, are terpenes from natural sources such as the volatile portion of oleoresin, or oil of turpentine, containing considerable amounts of alpha pinene. Similarly, steam distilled pine oil from old pine stumps provides an excellent source of suitable terpenes containing as it does alpha pinene, alpha terpineol, dipentene, various terpinenes, terpinolene, borneol, fenchol, camphor, etc. The pine oil from pine stumps may be employed directly as the terpene material for the reaction; but, where special terpenes are desired for the reaction material, the pine oil may be fractionated or otherwise refined to separate the individual components, such as alpha terpineol, or cuts or fractions of pine oil which contain large portions of particular pine oil ingredients.

The new products of this invention formed by the reaction of at least 3 moles of an alkylene oxide with 1 mole of an unsaturated or hydroxy terpene have particularly valuable properties as dispersing, wetting and cleansing agents. They may be employed with advantage in dispersing pigments and oils and are also adapted to be used as collecting agents in ore-flotation processes. They are particularly useful as dispersing agents for delusterants in materials such as viscose as described in my copending application Serial No. 494,395, filed July 12, 1943.

The following specific examples, employing parts by weight, will serve to further illustrate the present invention, but it is to be understood that the invention is not limited thereto.

Example 1

510 parts of alpha-terpineol is admixed with 5 parts of solid sodium hydroxide catalyst and placed in an autoclave which is heated to an initial temperature of 105° C. Then 1020 parts of ethylene oxide are gradually introduced into the autoclave during a period of about three hours, while agitating the autoclave, and during this period the temperature of the autoclave rises from the heat of reaction to about 147° C. The reaction is conducted so that the maximum pressure attained during the reaction is about 120 pounds per square inch which decreases to approximately zero gauge pressure upon completion of the reaction. The reaction product is a soft, sticky wax, dispersible in water, insoluble in mineral oil, and soluble in alcohol. The product melts at a temperature of 47.4° C.

Example 2

617 parts of commercial grade pine oil, consisting of a mixture of secondary and tertiary alcohols and unsaturated terpene hydrocarbons, is admixed with 5 parts of solid sodium hydroxide catalyst by triturating it with a small amount of the pine oil. This mixture is then placed in an autoclave which is heated to an initial temperature of 121° C. Then 1235 parts of ethylene oxide are gradually introduced into the autoclave during a period of about two and one half hours, while agitating the autoclave, and during this period the temperature of the autoclave increases from 121° C. to 164° C. The reaction is conducted so that the maximum pressure attained during the reaction is about 190 pounds per square inch which decreases to approximately zero gauge pressure upon completion of the reaction. The reaction product is a soft, greasy solid which is self-dispersible in water, insoluble in mineral oil, and soluble in alcohol.

Example 3

535 parts of the product of Example 1 are admixed with 5 parts of solid sodium hydroxide catalyst by triturating the materials. This mixture is then placed in an autoclave which is heated to an initial temperature of 120° C. Then 1170 parts of ethylene oxide are gradually introduced into the autoclave during a period of about two and one half hours, while agitating the autoclave, and during this period the temperature of the autoclave rises from 120° C. to 199° C. The reaction is conducted so that the maximum pressure attained during the reaction is about 200 pounds per square inch. The autoclave is then evacuated of unreacted ethylene oxide, and the reaction product is emptied into a weighed receptacle. The yield of final product is 1675 parts. The product is a waxy solid which is soluble in hot water to a clear solution, which upon cooling to room temperature, becomes a very finely divided, stable white emulsion. The product is insoluble in mineral oils, but is soluble in alcohol. The product melts at a temperature of 55.1° C.

Example 4

1208 parts of terpenyl ethylene glycol ether, known commercially as "Terpesol No. 8," are admixed with 5 parts of solid sodium hydroxide catalyst by triturating the materials. This mixture is then placed in an autoclave which is heated to an initial temperature of 120° C. Then 612 parts of ethylene oxide are gradually introduced into the autoclave during a period of about two hours, while agitating the autoclave, and during this period the temperature of the autoclave increases from 120° to 181° C. The reaction is conducted so that the maximum pressure attained during the reaction is about 110 pounds per square inch and upon completion of the reaction, the pressure decreases to about zero gauge. The reaction product is a rather viscous liquid, self-emulsifiable in water, and easily dispersible in oil and soluble in alcohol.

By the present invention, it is possible to take water-insoluble unsaturated and hydroxy terpenes and by reacting varying amounts of alkylene oxide with said compounds, it is possible to obtain compositions which vary from those readily soluble in oil to those which are at least colloidally soluble in water. By regulating the amount of alkylene oxide employed in the reaction it has been found possible to so balance the oil and water solubility of these compositions as to render them easily dispersible in either oil or water.

The products of the present invention may vary in composition from a viscous liquid, such as the product of Example 4, to a waxy solid, such as the product of Example 3. In general, the melting point of the final product will increase in proportion to the amount of alkylene oxide that is reacted with the terpene. An advantage of the process of the present invention is the flexibility in the number of reaction products which can be obtained by varying the number of moles of alkylene oxide which are permitted to react with each mole of the terpene. Thus, any number of alkylene oxide moles, for example, 4, 7, 15, 28, ad infinitum, may be reacted with each mole of terpene.

While the invention has been described in detail with specific examples, such examples are illustrative and are not given as limitations, since other modifications within the spirit and scope

I claim:

1. As a new composition of matter, a water dispersible product formed by the reaction of at least three moles of an alkylene oxide with one mole of a mixture of unsaturated and hydroxy terpenes, said reaction being carried out in the presence of an alkaline catalyst.

2. As a new composition of matter, a water dispersible product formed by the reaction of at least three moles of ethylene oxide with one mole of a terpene selected from the group consisting of unsaturated and hydroxy terpenes and mixtures of such terpenes, said reaction being carried out in the presence of an alkaline catalyst.

3. As a new composition of matter, a water dispersible product formed by the reaction of at least three moles of an alkylene oxide with one mole of a hydroxy alkylene ether of a terpene, said reaction being carried out in the presence of an alkaline catalyst.

4. As a new composition of matter, a water dispersible product formed by the reaction of at least three moles of ethylene oxide with one mole of terpenyl ethylene glycol, said reaction being carried out in the presence of an alkaline catalyst.

5. As a new composition of matter, a water dispersible product formed by the reaction of at least three moles of an alkylene oxide with one mole of a terpene selected from the group consisting of unsaturated and hydroxy terpenes and mixtures of such terpenes, said reaction being carried out in the presence of an alkaline catalyst.

6. As a new composition of matter, a water dispersible product formed by the reaction of at least three moles of ethylene oxide with one mole of a mixture of unsaturated and hydroxy terpenes, said reaction being carried out in the presence of an alkaline catalyst.

7. As a new composition of matter, a water dispersible product formed by the reaction of at least three moles of ethylene oxide with one mole of a hydroxy terpene, said reaction being carried out in the presence of an alkaline catalyst.

8. As a new composition of matter, a water dispersible product formed by the reaction of at least three moles of ethylene oxide with one mole of pine oil, said reaction being carried out in the presence of an alkaline catalyst.

9. As a new composition of matter, a water dispersible product formed by the reaction of at least three moles of ethylene oxide with one mole of alpha-terpineol, said reaction being carried out in the presence of an alkaline catalyst.

WILLIAM O. ISRAEL.

REFERENCES CITED

The following references are of record in the file of this patent:

UNITED STATES PATENTS

| Number | Name | Date |
| --- | --- | --- |
| 2,089,569 | Orthermer | Aug. 10, 1937 |
| 2,125,968 | Theimer | Aug. 9, 1938 |
| 2,130,525 | Coleman | Sept. 20, 1938 |
| 2,213,477 | Steindorff | Sept. 3, 1940 |
| 2,220,462 | Sheffield | Nov. 5, 1940 |
| 2,327,053 | Marple | Aug. 17, 1943 |